US006738538B2

(12) United States Patent
Antaki et al.

(10) Patent No.: US 6,738,538 B2
(45) Date of Patent: May 18, 2004

(54) METHOD TO CONSTRUCT OPTICAL INFRASTRUCTURE ON A WAFER

(76) Inventors: Patrick R. Antaki, 1900 Preston Rd., PMB 267-303, Plano, TX (US) 75093; Mark N. Shepard, 7419 Gracefield Ave., Dallas, TX (US) 75248

( * ) Notice: Subject to any disclaimer, the term of this patent is extended or adjusted under 35 U.S.C. 154(b) by 0 days.

(21) Appl. No.: 10/028,876

(22) Filed: Oct. 25, 2001

(65) Prior Publication Data

US 2002/0150319 A1 Oct. 17, 2002

Related U.S. Application Data

(60) Provisional application No. 60/243,243, filed on Oct. 25, 2000.

(51) Int. Cl.[7] .............................. G02B 6/12; G02B 6/26; H01L 21/00
(52) U.S. Cl. .............................. 385/14; 385/15; 438/27; 438/29; 438/65; 438/66; 438/67; 438/31
(58) Field of Search ..................... 385/14, 15; 438/15, 438/24, 25, 26–29, 57, 59, 63–67, 31

(56) References Cited

U.S. PATENT DOCUMENTS 4,699,449 A * 10/1987 Lam et al. ................... 385/14
5,319,725 A * 6/1994 Buchmann et al. ............ 385/14
5,394,490 A * 2/1995 Kato et al. .................... 385/14
5,526,454 A * 6/1996 Mayer ........................ 385/49
5,761,350 A * 6/1998 Koh ............................ 385/14
6,250,819 B1 * 6/2001 Porte et al. .................... 385/88
6,343,171 B1 * 1/2002 Yoshimura et al. ........... 385/50
6,363,183 B1 * 3/2002 Koh ............................ 385/19
6,411,754 B1 * 6/2002 Akkaraju et al. ............. 385/22
6,421,473 B1 * 7/2002 Paniccia et al. .............. 385/14
6,456,766 B1 * 9/2002 Shaw et al. ................... 385/47
6,495,382 B2 * 12/2002 Yap ............................ 438/24

* cited by examiner

Primary Examiner—John D. Lee
Assistant Examiner—Daniel Valencia

(57) ABSTRACT

This invention discloses a novel method of manufacturing optical communications infrastructures that are implemented on a flat semiconductor wafer. This invention has the following characteristics which enable the efficient manufacturing of a combination of elements onto such a wafer: the inherent surface flatness, crystal purity and uniformity over a relatively large dimension for semiconductor wafers; the low cost and wide availability of such wafers; and the ability to combine several types of elements onto the wafer, on a very dense scale, and in a highly repeatable and mechanically aligned manner.

19 Claims, 14 Drawing Sheets

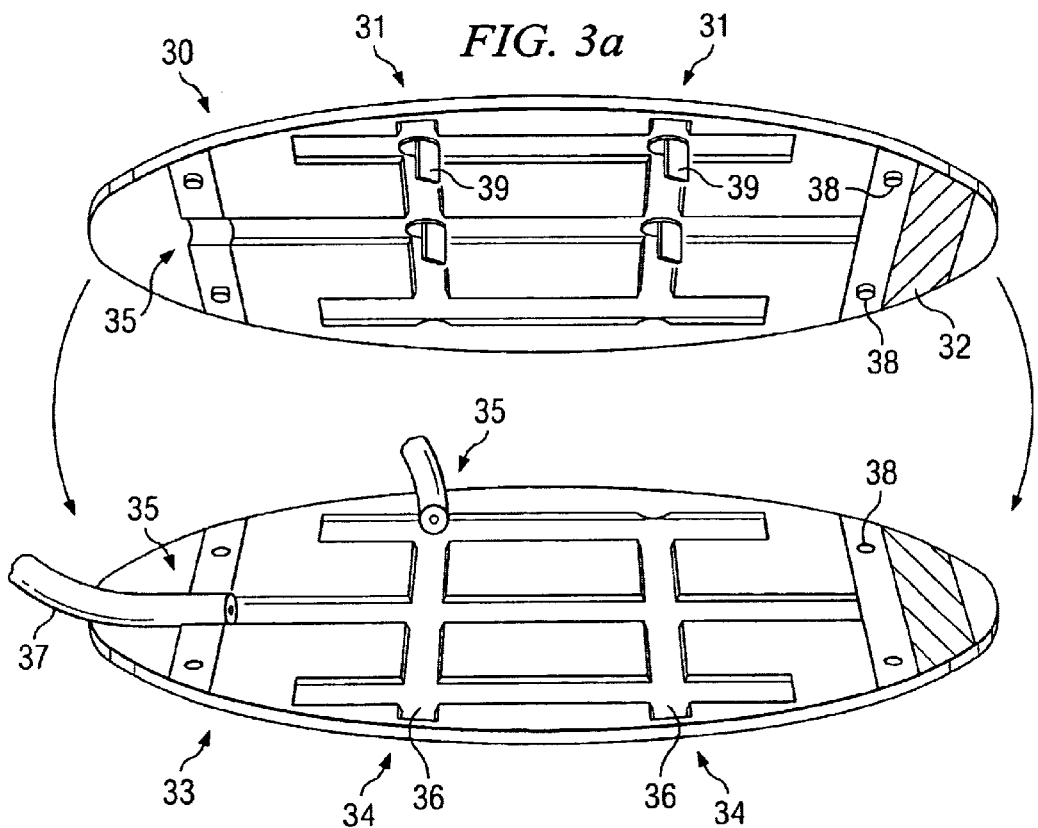
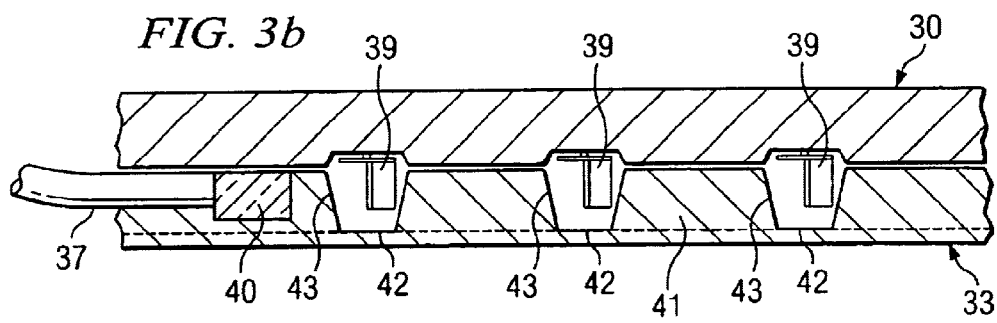

METHOD TO CONSTRUCT OPTICAL INFRASTRUCTURE ON A WAFER

RELATED APPLICATIONS

This application is based on a Provisional Application, Serial No. 60/243,243, filed on Oct. 25, 2000, entitled "Optical Infrastructure on a wafer."

FIELD OF THE INVENTION

This invention describes an optical communications infrastructure for implementation on a flat semiconductor wafer, useable in Optical communications, switching, routing.

BACKGROUND OF THE INVENTION

The explosion of the Internet, E-business, and multimedia applications has created a tremendous need for increased bandwidth. To address these demands, there has been considerable interest in creating micro-mirror arrays for optical networking applications that are capable of carrying vast amounts of date. Currently available sub-micron silicon CMOS fabrication technologies and micro-machining techniques provide the opportunity to create an intelligent cross-bar switch, based on micro-mirror arrays or other optical switching components, for optical telecommunications applications. The main benefit of merging these technologies on-chip is the capability of performing cross-bar switching between a number of optical telecommunications channels with low signal attenuation and in a very compact structure. The integrated switch system shall also be capable of detecting and identifying the data content of incoming optical channels, and re-configuring the switching pattern accordingly. The built-in intelligence of the system, together with its compactness and its low insertion loss, should make this device very attractive for a number of high-speed telecommunications applications.

In order to sample the incoming optical signals and to perform the switching according to the data content of each channel, the optical signals must be re-directed on an array of optical sensors which are built into the substrate. An optical beam splitter structure can be used for this purpose. Each optical sensor will continuously detect the incoming data stream and direct this information to a built-in decision and control unit. Based on the extracted information (for example data headers or specific patterns contained in the data stream), the control unit will identify the data content of each channel and re-configure the switch matrix accordingly. This capability offers truly adaptive switching between a number of incoming channels, where a change in data content of an incoming channel during operation will automatically result in re-direction of the outgoing channels. The conditions for signal recognition and re-routing of channels can be pre-programmed into the computational unit, based on a set of criteria for channel switching. In addition to these applications, there is an emerging area of optoelectronic information processing which is based on permutation networks. The availability of an intelligent optical switch array based on micro-mirrors could also have important implications towards the implementation of such novel architectures.

These new micro-fabrication technologies allow the fabrication of ultra small movable structures. This can be used for micromirrors which can be, for example, electrostatically actuated. Although the switching speed of micromirrors is not very high compared to electro-optical modulation, micromechanical structures have been considered for several applications such as projection displays, scanners, cross-connections of optical fibers and optical switches arrays. Micro-mirrors can be realized in silicon bulk micromachining, polysilicon surface micromachining and metal thin films. The most common actuation principle is electrostatic force which scales best with small dimensions, but electromagnetic, thermo-mechanical and piezoelectric actuation can also be applied.

One of the most advanced application in micro-mirrors arrays to date is the "Digital Mirror Device" (DMD) which has been developed by Texas. The DMD is a micromechanical spatial light modulator array which consists of a matrix of tiny mirrors (16 $\mu$m base) supported above silicon addressing circuitry by small hinges attached to support post. The pixel can be made to rotate about its axis by applying a potential difference between the pixel and the addressing electrode.

Building on the emerging technologies described above, it is an object of the current invention to disclose a novel method for the construction of high density optical switches that is simpler, more cost efficient, and allows for the construction of more complex systems on a single wafer than that was possible with conventional methods.

SUMMARY OF THE INVENTION

This invention discloses a novel method of manufacturing optical communications infrastructures that are implemented on a flat semiconductor wafer, and the optical devices that are made possible by this manufacturing process. This invention has the following characteristics which enable the efficient manufacturing of a combination of elements onto such a wafer: the inherent surface flatness, crystal purity and uniformity over a relatively large dimension for semiconductor wafers (i.e., 8-inch or 10-inch diameter wafers can be used in Silicon semiconductors); the low cost and wide availability of such wafers; and the ability to combine several types of elements onto the wafer, on a very dense scale, and in a highly repeatable and mechanically aligned manner.

Elements that can be fabricated onto the wafer include electronic components (e.g., transistors and conductors), mechanical components that are native to the wafer (e.g. alignment grooves, alignment pins, micro-mirrors, electro-mechanical actuators, optical waveguides, refraction-index changing optical switches, and diffraction gratings), mechanical or optical components that are foreign to the wafer (e.g., mirror sub-assemblies, external fiber optic cables, lenses, and diffraction gratings), and foreign electrical components (e.g., silicon or separately manufactured optical-to-electrical or electrical-to-optical converters).

A key use of this invention is for building dense (on the order of 10,000 by 10,000 on a 10-inch diameter wafer) N-by-M arrays of optical switches using various types of mirrors or optical switching mechanisms, organized in an N-by-M 2-dimentional matrix ("switching matrix") built onto a flat semiconductor substrate (such as Silicon), connected to N input fiber optic cables (or less if wavelength splitting is used on the wafer) and M output fiber optic cables (or less if wavelength combining is used on the wafer). The input and output fibers are optically interconnected to the switches via optical waveguides in the wafer.

This switching matrix on a wafer allows the optical coupling (connection) of any one of N inputs to any one of M output optical signal paths in any arbitrary combination. Additionally, the switching matrix allows for the following features: redundancy in routing paths as well as in fiber connections; the routing of a pilot optical signal for self diagnostics of the switching array; the routing of input signals to multiple output paths (i.e., multicasting); the routing of input signals to secondary non-intrusive functions such as: optical power measurement, performance monitoring, alternative wavelength decoding; the separation of individual wavelengths from each input fiber and its individual routing within the same matrix to any output fiber (as well as to the secondary paths, and multicasting); the optical combination of various wavelengths from one or more input fibers into the same fiber output; the provision to incorporate wavelength translation components within the switch matrix; automatic alignment of input and output fiber optical paths to the on-wafer optical signal paths; the ability to scale the matrix up (or down) in density, and scaling of optical waveguide dimensions using built-in 3-dimensional waveguides within the switching matrix; automatic one-step alignment during construction of all optical components and paths; the ability to incorporate control and monitoring electronics which are embedded within the wafer; the ability to add non-native optical and electronic components in a fully optically aligned fashion to the wafer material; the ability within the matrix to variably attenuate an input optical signal (either full fiber or sub wavelength); the ability to adjust the power levels in any number of 1-to-N routings of an input optical signal; the ability to insert optical amplifying elements within the switching element; and finally, the ability to cascade multiple switches for increased matrix size, or for the incorporation of additional secondary functions.

A key feature of the invention is that the optical paths are parallel, rather than orthogonal, to the "working surface" (in this case, the surface of the wafer). Implementations known in the art commonly use complex 3-dimensional structures to perform the switching functions from the input fibers to the output fibers, or, in case of the Texas Instruments DMD or LCD-on-Silicon graphics systems, the light path is orthogonal to the wafer (the mirror is flat on the wafer). Compare this to the instant invention, which uses flat 2-D structures on the wafer itself. By eliminating variations in the third-dimension because of the wafer's flatness, the invention enables the fiber, optical waveguide, and optical switching elements to be inherently aligned to each other during fabrication by simply using conventional wafer-processing techniques (for the x- and y-dimensions).

BRIEF DESCRIPTION OF THE DRAWINGS

FIG. 3 shows the wafer sandwich technique.

DETAILED DESCRIPTION OF THE INVENTION

Figure 1:
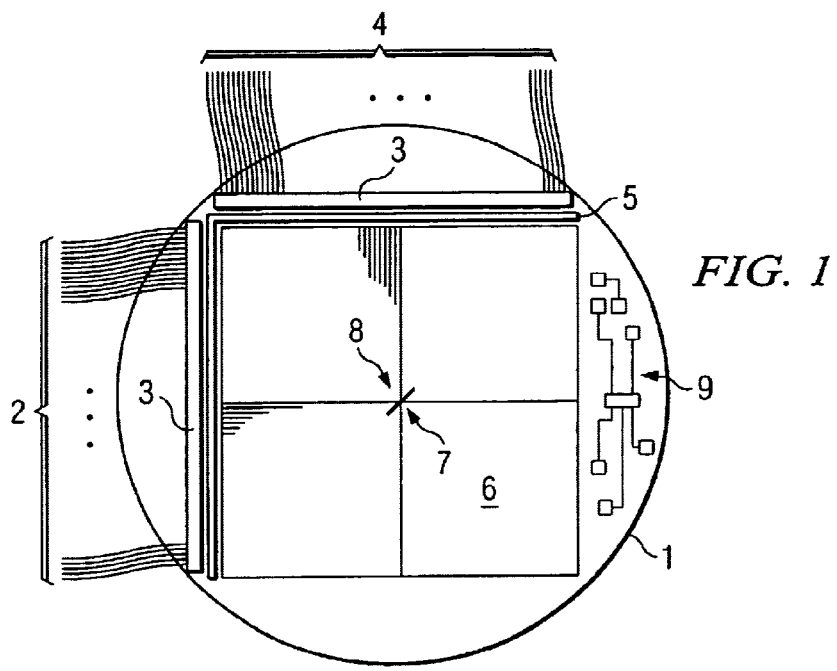
FIG. 1 shows a general high level depiction of a switch matrix that can be manufactured by the novel process.

To facilitate our discussion, the following definitions are given:

"Input fiber" means a fiber carrying an optical signal to be fed from the outside world into the switch and routed to an output fiber (and/or to a secondary function)

"Output fiber" means a fiber carrying an optical signal fed from the switch to the outside worlds. Note that due to the duality of the Switch and that of optical properties in general, input and output fibers may be used interchangeably, including an interspersed pattern in the "input" side containing input and output fibers, and the same on the "output" side.

"Optical path" refers to the physical path which an optical signal takes from its source (the input fiber) to its final output (output fiber), including to any secondary function destination.

"Optical signal" refers to a signal which may contain one or more wavelengths, and which is represented by a single optical beam. Optical signals may change their character or content as they are routed within the switch matrix. An optical signal may contain either or both digitally and analog encoded information within it.

"Switch" or "Invention" are used interchangeably in this document. These refer to any one or more aspects of this invention, including any combinations, derivatives, etc.

"Switch matrix" refers to the array of mirrors in the center area of the overall switch.

"Mirror" is an optically reflective surface which is controlled via several means to interrupt and re-route an optical signal or not, based upon a control input. This mirror may have characteristics that may be designed or selected (such as insertion loss, reflection angle, etc.)

"Secondary functions" refers to functions within the switch whereby some of the optical energy of an optical signal is diverted (whether intrusively or not) to an physical element whose function is other than to route that optical signal to an output fiber (this includes optical power measurement, optical-to-electrical conversion and further signal processing, etc.)

"Native materials" refers to the materials and the portion of the switch which is manufactures onto the Silicon wafer in a bulk process (similar to conventional semiconductor wafer processing).

"Non-native materials" or "non-native elements" refers to physical elements within the switch which are not natively built from the Silicon wafer, but are pick-and-placed onto the switch. Elements that are chemically deposited using more conventional semiconductor processes (such as upper layers of metal, which is clearly not a native semiconductor material), for the purposes of this invention, are not "Non-native materials".

"Silicon wafer" refers to an ultra-flat semiconductor and large surface material. Other semiconductor materials may be effectively used as well, separately from pure (conventional) Silicon.

"Pick-and-place" refers to the process of physically transporting a physical element from one location (such as a storage or carrying container) to a position onto the switch for permanent attachment (much like conventional surface-mount assembly of electronic components onto a printed circuit board).

"Off-site manufacturing" refers to the manufacturing processes of elements which are pick-and-placed onto the switch, but which utilize manufacturing techniques that are independent from those used to manufacture the native material portion of the switch.

"Actuator" is a device which causes the mechanical motion of an element. The actuator may be a motor (eletrostatic, comb, etc.) or an electromagnetic field generator (i.e., a current-carrying loop working on a magnetized element), a thermally-actuated actuator, or equivalent.

Utilizing current MEMS and Semiconductor (Silicon) processing technology, a preferred embodiment of this invention is depicted in FIGS. 1 to 3. FIG. 1 shows a drawing of a silicon wafer (1) typically 8 or 10 inches in diameter. On the left side are input optical fibers (2) which carry the optical signals coming in at a typical density of 200 or more fibers per inch. These are laid flat across the side are aligned by a fiber alignment structure (3) built into the wafer. The optical signal enters from one side of the wafer (the left side in FIG. 1) into optical guides that are inside the array of waveguides (6) inside the wafer. On the top side of the wafer in FIG. 1 are output fibers (4) (in the same density of over 200 fibers per inch) that carry the optical signal output to the rest of the network. The output fibers are also aligned by a fiber alignment structure (3). The way an optical connection happens is by virtue of turning a switching element (7) (e.g., a mirror or an optical switch) on and off at the intersection of each path between an input fiber and an output fiber (one such intersection is shown at (8)). Each path is electronically programmable based upon the network configuration at that time. Optionally, additional holding elements (5) for the fibers can be added by mechanical assembly into the wafer. These can include wavelength splitters (e.g., a diffraction grating), lambda or wavelength converters. Various Optical/Electrical conversion and monitoring circuitry (9) might be used for other functions such as monitoring the power of the input fibers, performing an optical to electrical conversion, etc. As mentioned before, a key concept of the invention is that this wafer, which is very flat and relatively large in dimension, can act as an infrastructure for switches because it can connect and align optically thousands of fibers in each x and y dimension, as well being able to hold thousands of optical waveguides and millions of optical switches. Further, the wafer has the ability to be a mechanical alignment and placement infrastructure for holding other optical elements, imbedded optical electrical conversion circuits and other such monitoring circuits that were manufactured separately and then placed into this system.

Figure 2A:
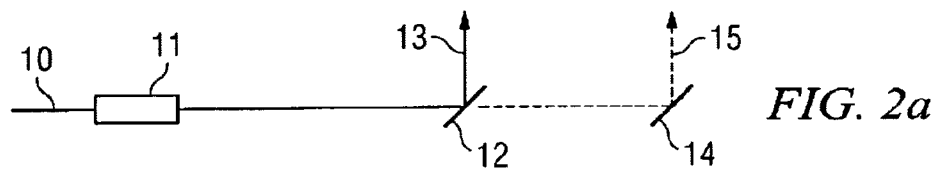
FIG. 2 shows logical drawings of how optical paths are created in a connection from the input to the output.
Figure 2B:
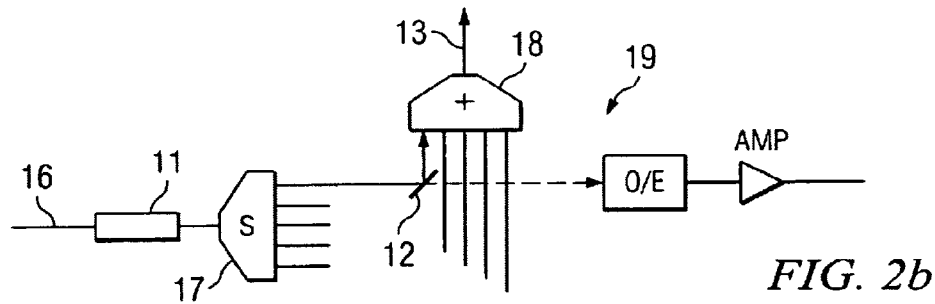
Figure 2C:
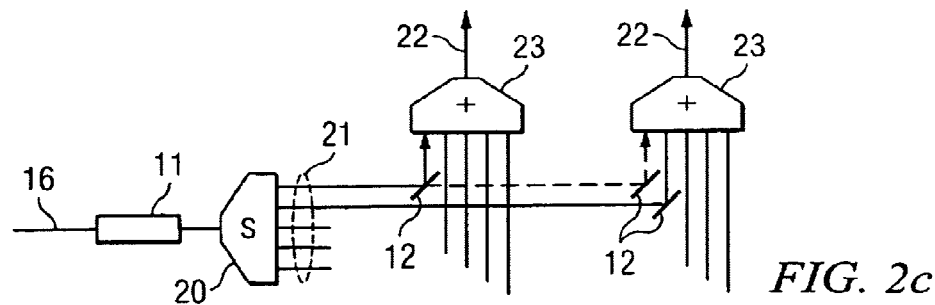
Figure 4A:
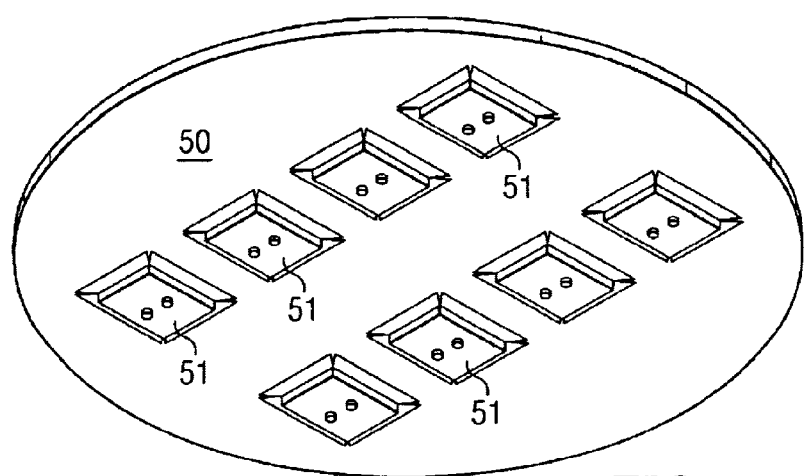
FIG. 4 shows the sacrificial wafer construction technique.
Figure 4B:
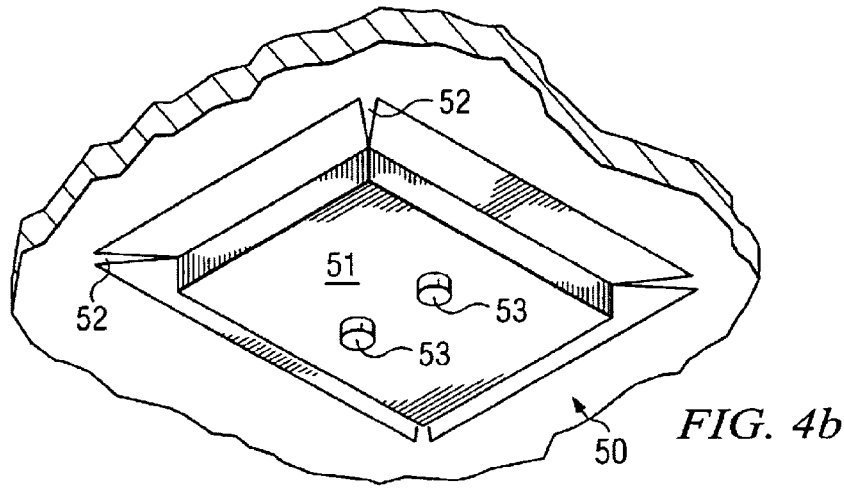
Figure 4C:
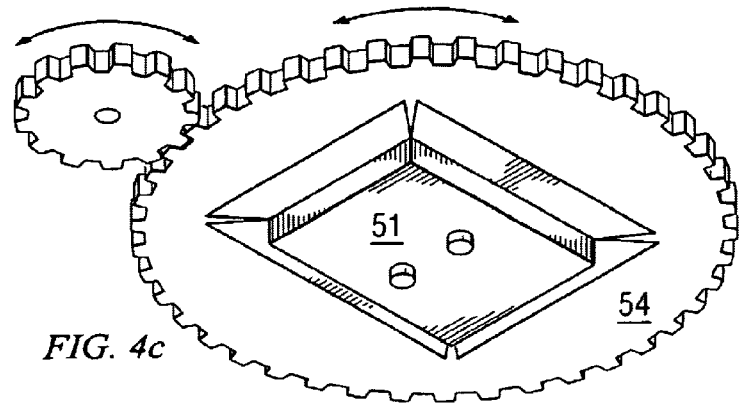
Figure 4D:
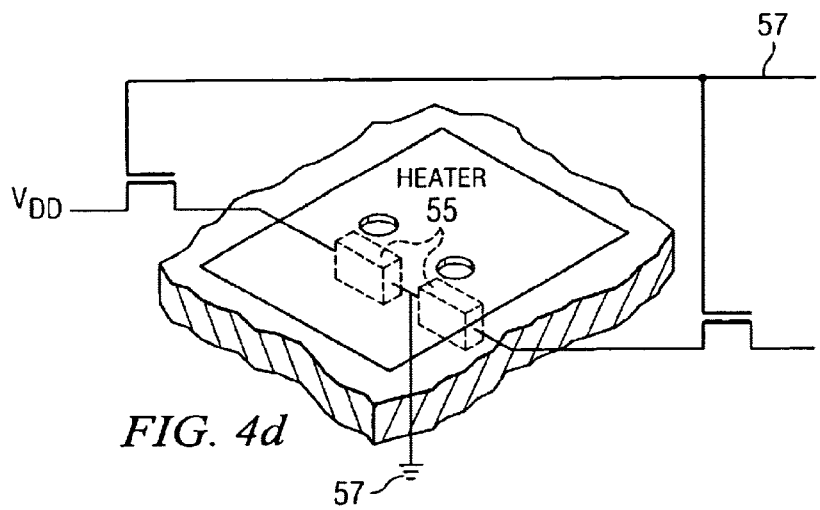
Figure 4E:
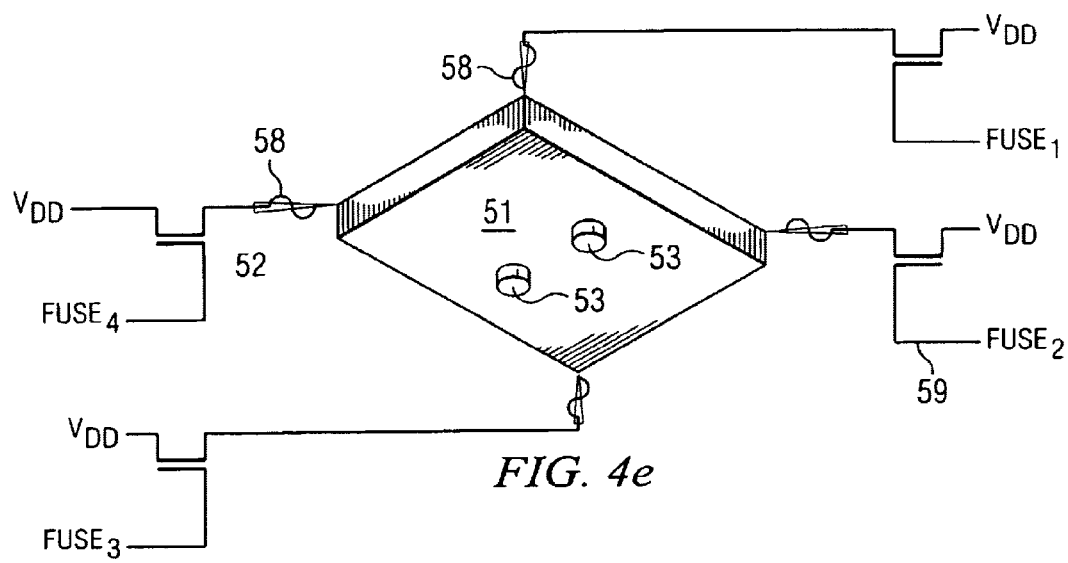
Figure 4F:
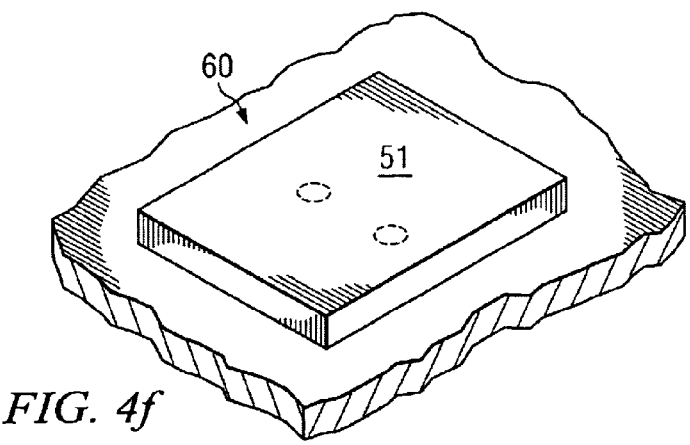

FIG. 2 shows logical drawings of how optical paths are created in creating a connection from the input to the output. FIG. 2a shows a simple 1 to 1 switch. An input fiber (10) has been columnated such that the signal is carried from the input fiber to the waveguide on a chip (11) on the wafer. The light is then directed to a mirror (12), shown here in the "on" position, which is fully reflecting the light (the light going through a waveguide in the y direction, not shown) to the output fiber (13). If mirror (12) was turned "off", there is another mirror behind it (14) where another connection of the input fiber to a different output (15) fiber is possible. If the first mirror were to be, for example, tiled 90%, then 90% of the light can go to the output fiber and 10% might go a monitoring circuit. FIG. 2b shows an individual wavelength switch in a slightly different combination, wherein the input fiber (16) carries multiple wavelengths (such as in wave length division multiplexing) and goes through a wave length splitter (17). Typically the splitter would be an externally manufactured component which is mechanically placed onto the wafer infrastructure and attached, as well as optically aligned both on the input side as well as on its output to the rest of the optical wave guides on the wafer. Again, a mirror (12) is placed on each particular cross point connection that needs to be made. On the output fiber guide a wavelength combiner (18) is used to combine multiple wavelengths (having been switched from different input fibers or at least different input wave lengths) together into one output fiber (13) in exactly the opposite operation as was done on the input side. All of this is still compatible with the ability to do optical to electrical conversion, monitoring, etc. on the opposite side of the wafer (19). FIG. 2c again shows a 1 input to N output switch plus variable attenuator or multicast routing. Instead of having a wavelength splitter as in 2b, we have a beam splitter (20), which essentially can be used as a partial optical attenuator as well as another form of performing multicasting. The input fiber (16) carries a particular optical wavelength which one is columnated is known. Assuming the beam splitter splits the input beam into N beams, then there is 1/N th the power of the input fiber into each x-direction optical waveguide (21) on the wafer. By turning on the appropriate set of optical switches, any one of these 1/N th power signals can be routed to any one of N output fibers (22). Additionally, since the output fiber has a comparable combiner (23) to combine either different wavelengths or different power inputs for multicasting, the output fibers can have, for example, more than one optical switch connected such that the same input is connected at multiple times. This would allow the output fiber to have 10, 20, 30, 40, 50% etc. of power of the input fiber. This arrangement creates a form of variable optical attenuation that is combined with switching. Finally, FIGS. 2b and 2c can be combined to obtain separation of wavelengths within a single fiber. Adding secondary beam splitters each wavelength splitter could be done such that one could use the switching fabric to do both wavelength multiplexing from various input fibers, as well as the selective multicasting of one or more of these wavelength signals.

FIG. 3 depicts the wafer sandwich construction technique according to the invention. In this technique, two wafers are aligned face to face to create an enclosed optical system. Different processes may be used on each wafer to simplify fabrication and creation of structures in components. Refer to FIG. 3a. The top wafer (30) may contain an array of mirrors with actuators (31, not drawn to scale) and control circuitry for the mirrors (32). The bottom wafer (33) may contain waveguides (34) and fiber alignment structures (35). One of the advantages of this process is that different, even incompatible MEMS or semiconductor fabrication processes can be used to fabricate each component on the two wafers. The top (30) and the bottom wafers (33) are brought together to create an enclosed optical system. On the bottom wafer, on the left edge and the rear edge of the wafer optical fibers are aligned and held in a the fiber alignment structures (35) which are basically "v" grooves that have been edged on the wafer to precisely align each one of the fibers. (Note only one input fiber (37) is shown here). In the middle of the bottom wafer there are waveguide structures (36) that are etched into the wafer that are a continuation of the "v" grooves. Space for monitoring electronics and so on is also present. On the edges of the both wafers are wafer alignment structures (38) that mate into corresponding structures in the other wafer. These would be produced with micro machining techniques, and would be an integral part of the wafer and precisely aligned to all of the other optical structures on the wafer. In the center of the top wafer some examples of optical components are shown at positions that would be above the intersections of the waveguides when the top wafer is brought down to it. In this example the optical components are mechanical mirrors (39). Referring to FIG. 3(b), a cross sectional view of the two wafers after they have been brought together is shown. On the left side a side view of an input fiber (37) and then going toward the right is a collimator (40). Both of these components are in a "v" groove, which is shown edge on (41). To the right are "v" grooves which are perpendicular to the plane of the page (42), with mirrors (39) hanging down from the top wafer into the intersection of the two "v" grooves (43). (A whole set of mirrors, not shown, are all in line to the ones that project down into this "v" groove.) The whole structure would be in the order of 100 μm thick.

FIG. 4 shows the sacrificial wafer construction technique according to the invention. This is a technique that is similar yet different from the wafer sandwich technique discussed above. The similarity is that parts are fabricated on one wafer and then the two wafers are brought together. The difference is that in the sacrificial wafer construction technique, the parts that are fabricated on the top wafer are installed by various means on the bottom wafer and then the parts are detached from the original (top) wafer, the top wafer is removed and discarded, leaving the bottom wafer with parts installed. First, in FIG. 4a (step number 1), there is an array of parts (51) on a top "sacrificial" wafer (50) (e.g., some type of mirror assembly.) These parts are constructed in a matrix that corresponds to the waveguide matrix on the lower wafer so that when they are brought together and properly aligned, the parts will fit into the intersections of the waveguides. FIG. 4b depicts step number 2, and shows a close up of a single part (51) as it is fabricated on the top "sacrificial" wafer. The part is attached to the top wafer (50) via fusible links (52) at each of its corners. There are also pins for electrical contact (53) in mechanical alignment of the part once it is installed. FIG. 4c depicts step no. 3, and shows an example of how a mechanism might be fabricated on the top wafer to individually align each one of the parts in the matrix of parts at construction time. The idea here is a mechanism such as a MEMS mechanism, such as a disposable actuator (54), could be fabricated for one time disposable use. In this example, a part (51) is rotated and aligned during installation before the part is detached from the top wafer. This can be done individually for each one of the parts separately. FIG. 4d depicts step no. 4, showing how the parts are electrically and mechanically attached. In this case we assume that some solder has been placed on the contact pins of the part before it was brought into contact with the lower wafer, and we also assume that on the lower wafer we have fabricated underneath the part placement site heating resistors (55) connected to electrical circuitry (57) that allows us to individually heat the part placement site to solder and attach the part. Or a simpler mechanism would be to heat the entire wafer assembly and allow the solder to melt. In step no. 5, FIG. 4e, a schematic of how the fusible links could be blown to release the part from the top "sacrificial" wafer is shown. On the top wafer is constructed a set of transistors (58) that allow a current to run through each one of the fusible links that attaches the part to the top wafer, and through the bottom wafer via the electrical connections that was made in step no. 4. In a preferred embodiment, transistors which would be used only once during the construction process are constructed on the top "sacrificial" wafer. By applying control signals to turn on each one of the transistors, a current could be applied through the fusible link, thereby melting the link and releasing the part (51). And then in the final FIG. 4f, an abstract of the part installed on the lower wafer (60) is shown. At this point the top "sacrificial" wafer would be removed and discarded.

Figure 5A:
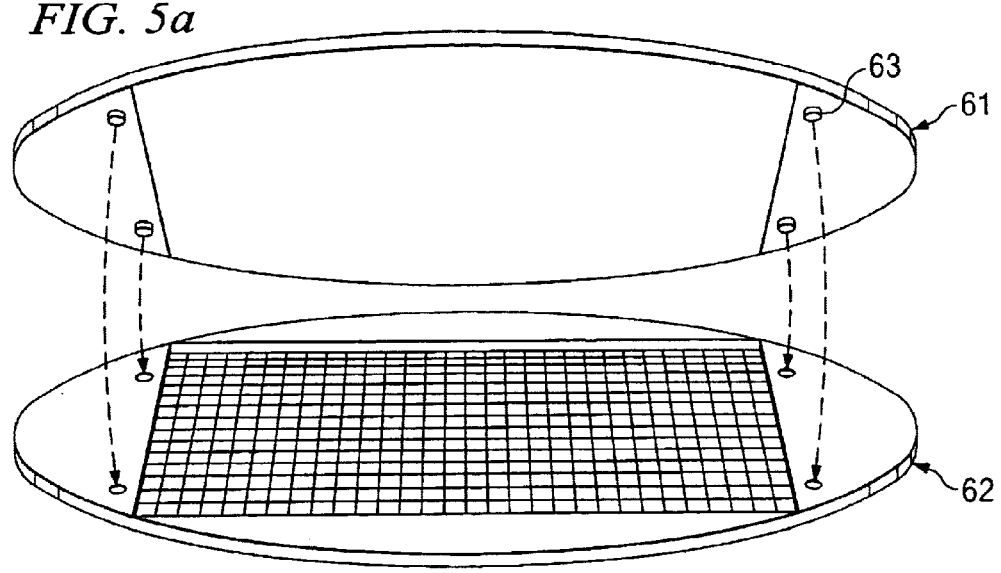
FIG. 5 shows the top and the bottom wafer with alignment ends.
Figure 5B:
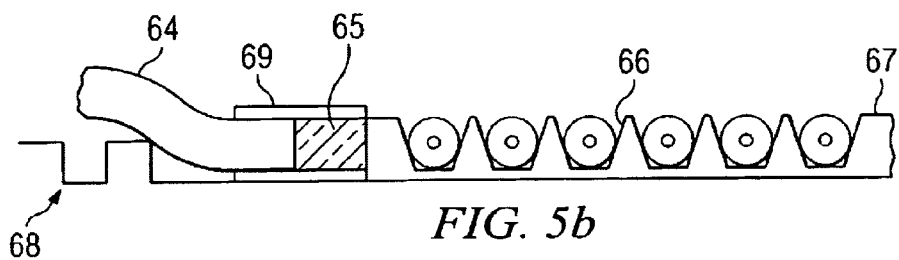
Figure 5C:
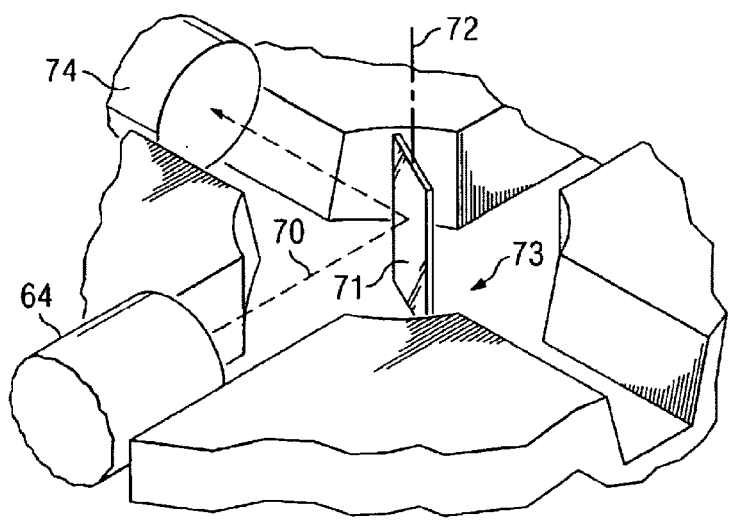

FIG. 5a is a continuation of FIG. 3 in that it shows again the top (61) and the bottom wafer (62) with alignment means (such as pins with matching holes) (63) such that the two wafers are sandwiched together, it is possible to get them aligned with high precision. The alignment pins and holes are micro machined, and should have high precision and accuracy that is comparable to the rest of the precision of the optical system that is built to each of those two wafers. FIG. 5b shows potentially how a fiber (64) can be aligned to a collimator (65) and to the grooves (66) which are etched onto a wafer (wafer surface (67)), such that in the grooves are both alignment targets for placement of the fiber (68) as well as for the actual waveguides that are built into the wafer. A fiber/collimator coupling assembly is shown at (69). FIG. 5c shows an example of a fiber (64) (on the order of 125 μm or smaller in diameter) being coupled to a waveguide. (The collimator assembly is not shown.) The light travels down that optical waveguide (70), and the grooves where the intersection of the vertical and horizontal waveguides meet is a site for a mirror (73). The mirror (71) is rotated in or out of the optical path along an axis (72) such that light travels from left side to the right side if the mirror is "off", or if the mirror is in the "on" position, light is deflected 90 degrees into another output fiber (74).

Figure 6A:
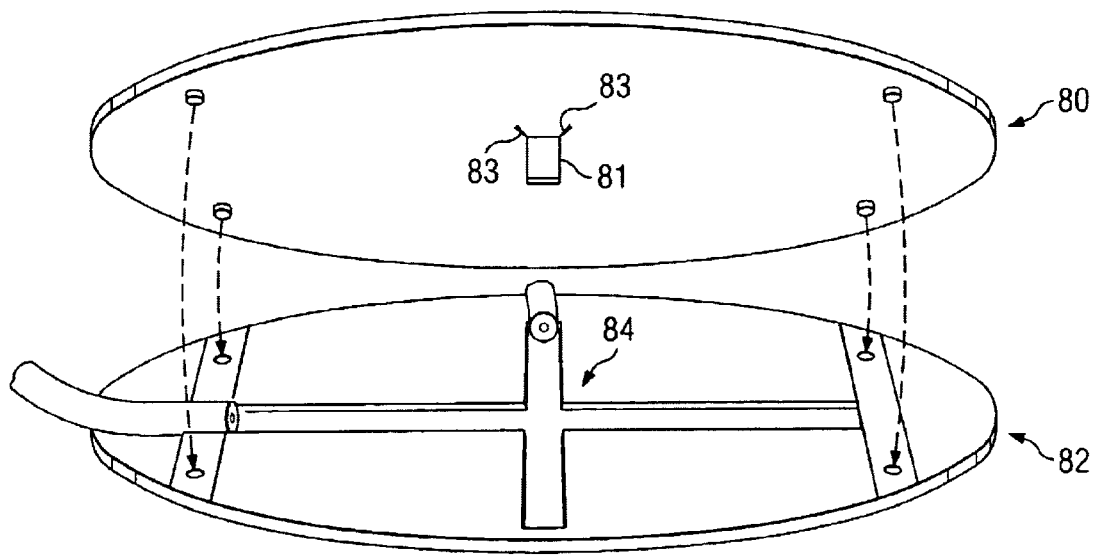
FIG. 6 compares construction using sacrificial and non-sacrificial top wafers.
Figure 6B:
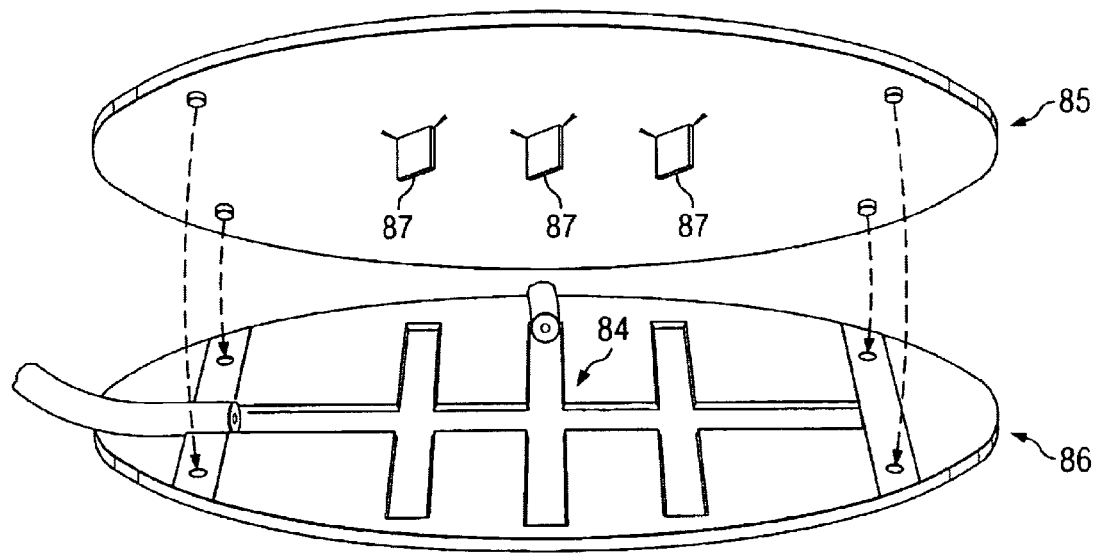

FIG. 6 is expands on FIG. 4 and shows two mechanisms constructed by the different sandwiched wafer techniques. One is sacrificial, one is non sacrificial. In the sacrificial case shown in FIG. 6a, the upper wafer (80) is used to place prefabricated mirrors on its mirrored component (81). The sacrificial wafer can be fabricated using various available techniques, and then its held (upside down) above the infrastructure wafer (82). The wafers are brought together using various alignment techniques previously discussed. The optical switching components are placed into contact with installation sites (84) fabricated on the bottom wafer, mechanical and electrical connections are then created between the bottom wafer and the optical switching components via techniques such as soldering (e.g., using previously applied solder and a heating resistor). Once the optical switching components are attached to the bottom wafer, they are released from the top wafer by various means, such as using circuitry on the top wafer to route current through the links (83) holding the components, and thereby fusing the links, or by a mechanism on the top wafer which is actuated to release or unlock the part. Finally, the top wafer (80) is removed and discarded. Hence the term "sacrificial". In a non-sacrificial technique shown in FIG. 6b, the upper wafer (85) would contain the mirrors (87), having been elevated and to stand vertically above the wafer. The bottom wafer (86) would contain waveguides and so forth. After construction, the upper wafer becomes the actual mirror layer wafer whereas the bottom wafer becomes the waveguide wafer including the holder of the fibers. These are two possible techniques. More variation of these are possible whereby different mechanical and manufacturing techniques are used to manufacturer different types of elements such as mirrors and waveguides on two separately processed wafers and then brought together in a sandwiched fashion.

Figure 7A:
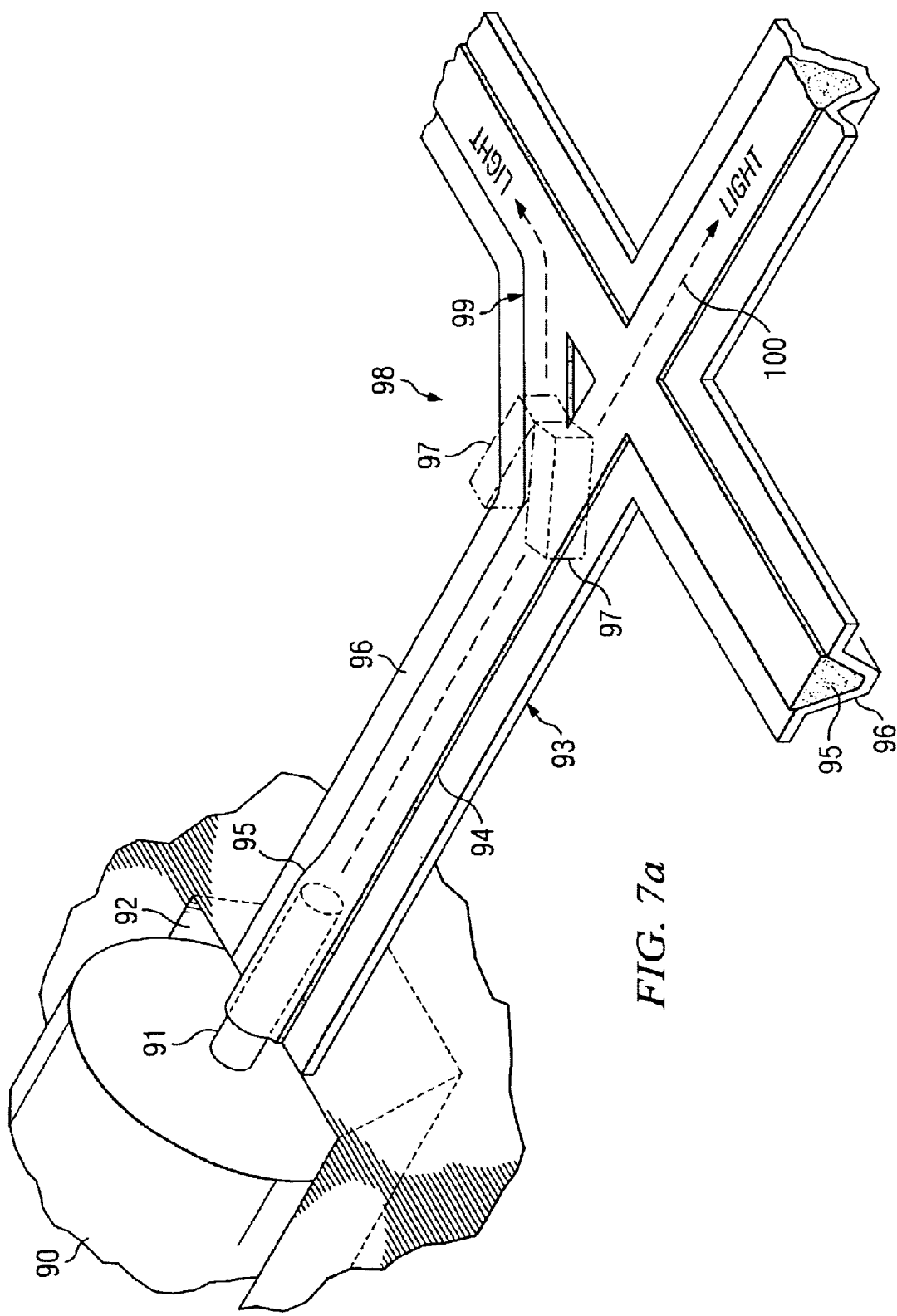
FIGS. 7 and 8 show how the fiber on the input or output side is coupled on the wafer to the waveguide.
Figure 7B:
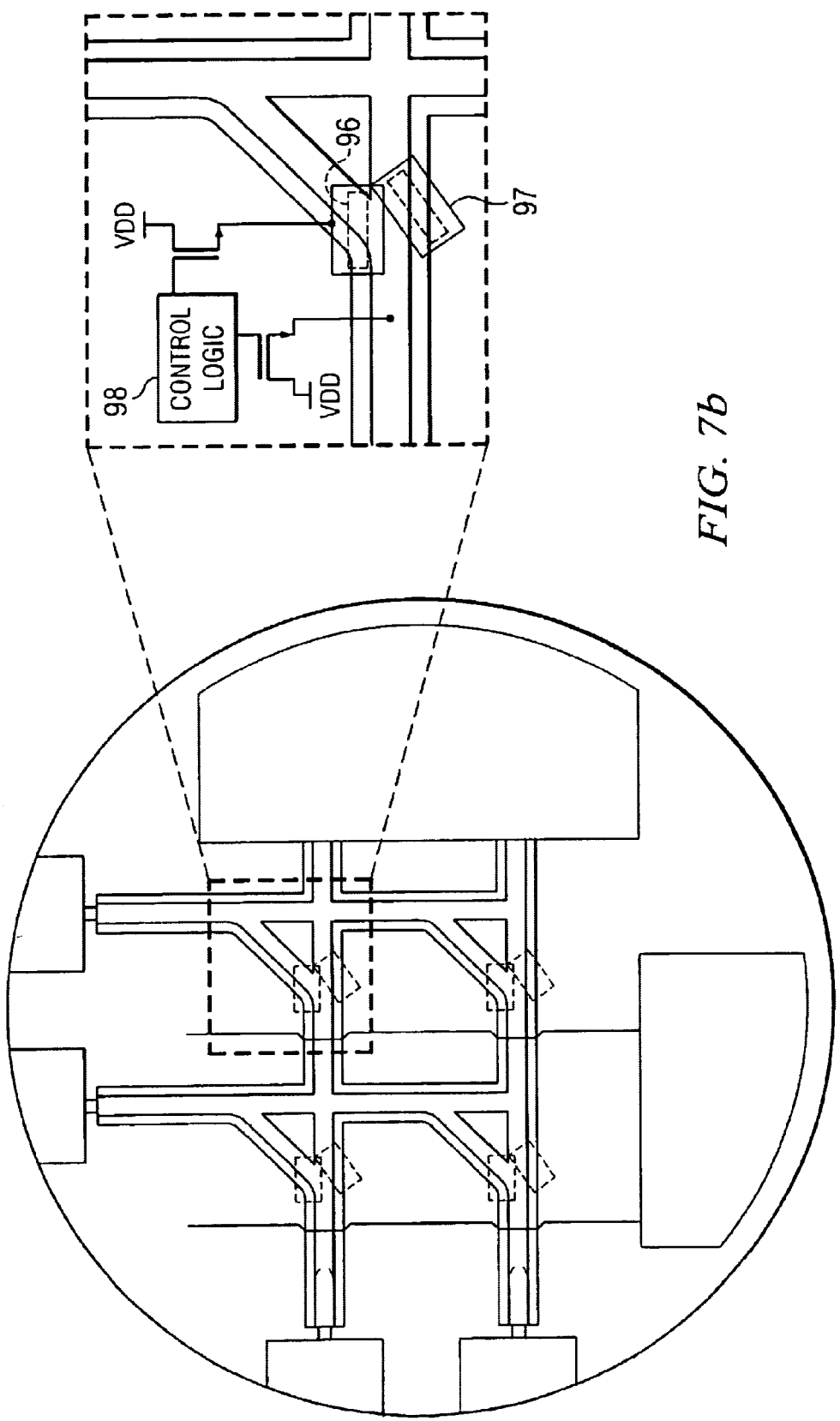

FIG. 7 is a detailed diagram showing how the optical fiber on the input or output side gets coupled to the waveguide on the wafer. Typically fibers (90) are 125 micro meters in diameter but the active core part of the fiber (91) where light actually travels is only 8 to 9 microns. According to the novel methods of the invention, grooves of about 125 micron width (92) are etched onto the water, onto which the fiber sits. The output of the core is optically coupled to the waveguides on the wafer through a fiber/waveguide interface (93). There are two sets of grooves, one being 125 micron wide and holds the outer layer of the fiber, and another set that's 8 to 10 micron wide onto which the core sits (94). Onto this core groove (94) is deposited two separate layers of materials by conventional semi conductor processing techniques: a high refractive index material (e.g. Silicon Nitride) (95) and a low refractive index material (e.g. Silicon Dioxide) on the outer edges of the core groove (96). The silicon nitride forms the mechanical bond to hold the fiber core to the wafer, as well as forming a direct optical coupling for all of the energy from the fiber into the optical waveguide. FIG. 7, also depicts a different type of optical switch than what was previously discussed. Instead of mechanical-optical mirrors which moves physically to reflect light, blocks made of a variable index of refraction material (97) such as lithium niobate is used. These blocks are electrically activated with a control electrode (98, not shown), which by applying a high voltage or a low voltage would change the index of refraction of the block, and therefore route to the light to one side (99) or allow it to pass through (100). By having two such structures you can bend the light either to the left side toward an output fiber or allow it go right through to hit some other potential switch. FIG. 7b shows examples of mirror control circuitry. Again, the control can be for a mechanical mirror or a index of refraction mirror, or any other kind of optical device electrically actuated.

Figure 8A:
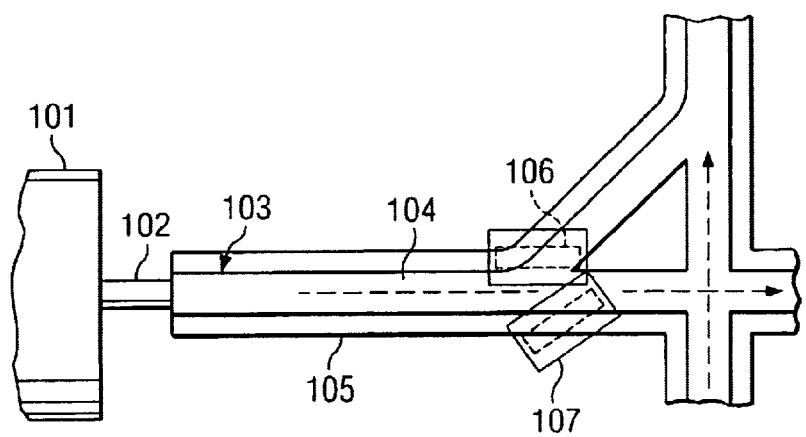
Figure 8B:
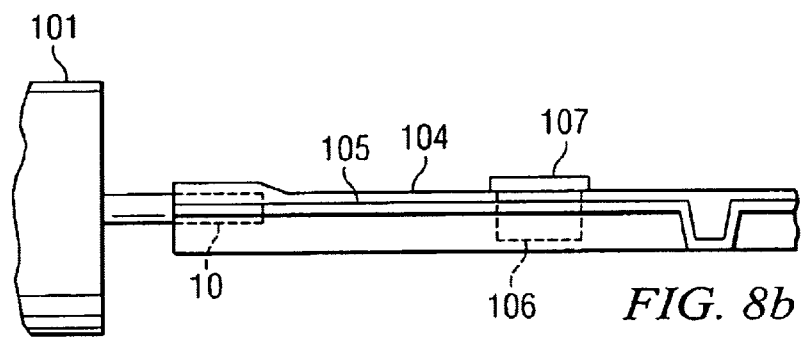

FIG. 8 is similar to FIG. 7. FIG. 8a shows the top view (looking down onto the wafer) of the 125 micron fiber (101) going down to its core (102) of 8 to 9 microns, mechanically and optically coupled to the waveguide (103). Material for a high index layer (104) and a low index layer (105) is deposited onto the wafer directly and becomes the waveguide. In this example, index refraction changeable waveguide switches (106) controlled by electrodes (107) are used. FIG. 8b is a cross sectional view. On the left side is the fiber (101) and in the center part of it is where the core of the fiber (102) goes in. A goal of this invention is to achieve a good mechanical link between the waveguide on the wafer and the mechanically held fiber on the edges of the wafer. Material of the waveguide can be deposited to cover the fiber/core (108) to achieve a good mechanical and optical link.

Figure 9A:
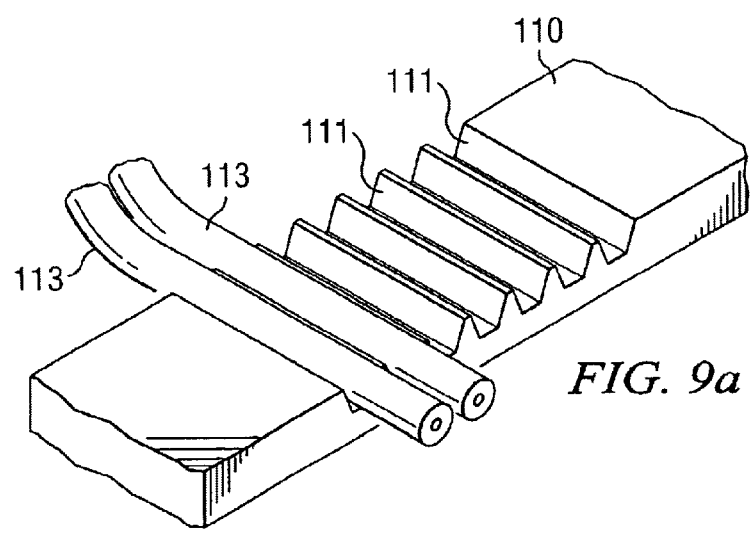
FIG. 9 shows a technique and mechanism for assembling and connecting the multiple thousands of fibers on a wafer.
Figure 9B:
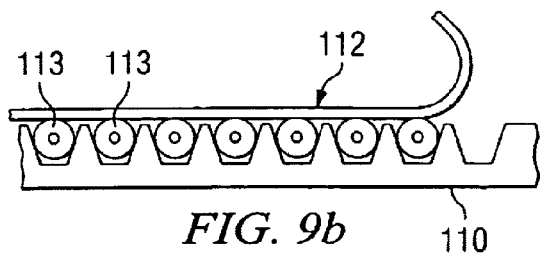
Figure 9C:
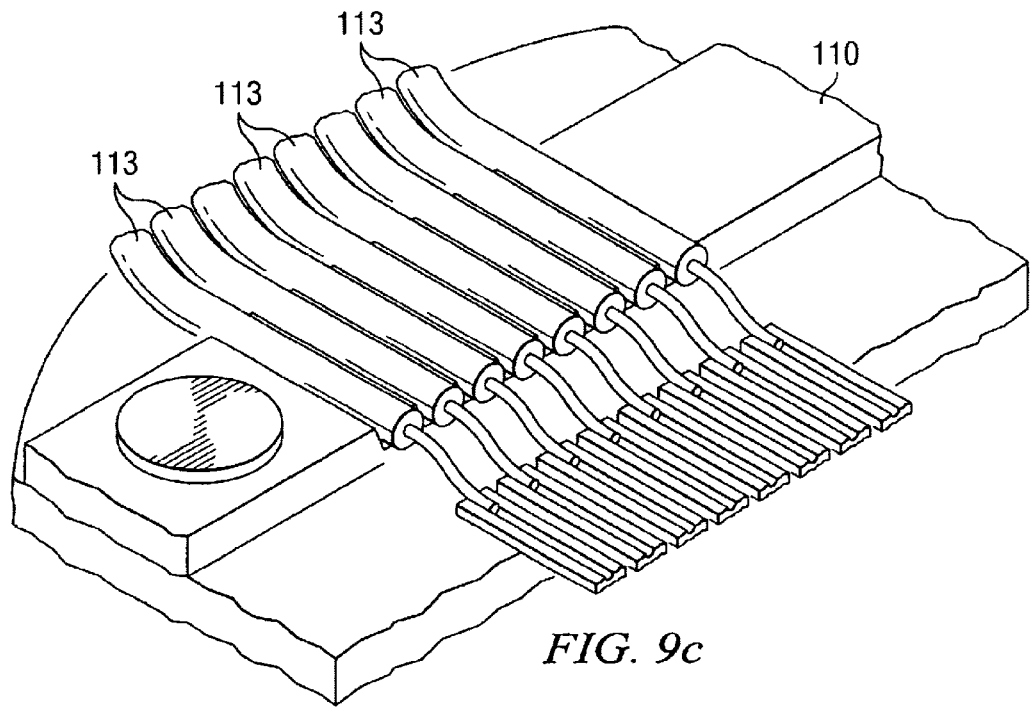

A technique and mechanism for assembling and connecting the multiple thousands of fibers on a wafer will be discussed next. For a switch, the multiple thousands of input fibers have to be perfectly lined up to the multiple thousands of optical waveguide, and then everything is mechanically fastened in place so that the whole system is stable. FIG. 9a shows a two-part assembly where the first step in the process is to create a long rectangular piece (110), which could be made of silicon, where the "v" grooves (111) on the order of 125 microns in width have been etched out of it. Each fiber is then placed inside (113) each "v" groove. FIG. 9b shows a cross section for the rectangular piece (110) showing how the fibers are laid within the groove mechanically. A piece of tape (112) or some other mechanism (e.g., a sandwich of another flat wafer, either with some v grooves in it or simply perfectly flat), to hold the fibers (113) down in place is laid on top of these thousands of fibers. This is an efficient way to bring in all these large numbers of fibers and have them on the right pitch, the right spacing and distance in preparation for coupling this assembly to the wafer system which contains the waveguides and switches. FIG. 9c introduces the secondary implementation concept related to the two-part assembly construction. In this case, the step of aligning the 125 micron fibers, as described previously in FIG. 9a and FIG. 9b, will be performed first, then a secondary step of aligning the 8 to 10 micron core of each fiber is performed. The fibers should have gone through a preliminary process to carve out the outer shell and only leave the core at the end of each fiber. The 125 micron pitch holder system (see FIGS. 9a, 9b) is used to align the outer shell of the fibers, then that is brought down to a 10 micron pitch system in a similar fashion and held in place by a 8 to 10 micron pitch holder system (a "second stage" holder). The third step would be then to couple the second stage holder into the wafer containing the optical waveguide and switches. In addition to what was just described, in a wafer sandwich system the use of alignment pins that are etched in or micro fabricated onto each of those pieces of wafers can still be used for overall gross mechanical alignment. One other advantage of this holder system is that the fibers/cores can be placed into the holders at different amounts of protrusion during construction. Once these are all placed, it is a simple process to cleave all the ends to equal length and the fibers/cores become mechanically held and aligned to where each fiber/core is protruding out exactly a predetermined and fixed amount from the edge of the holder structure. Further, Instead of using 125 micron pitch fiber, 8 to 10 micron pitch fibers can be used, thereby increasing the fiber density by a factor of 10.

Figure 10:
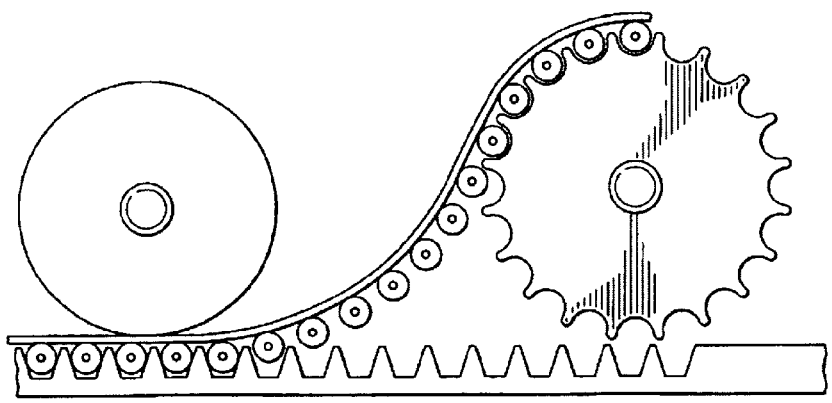
FIG. 10 shows a technique for placing fibers into the grooves of the fiber system.
Figure 11A:
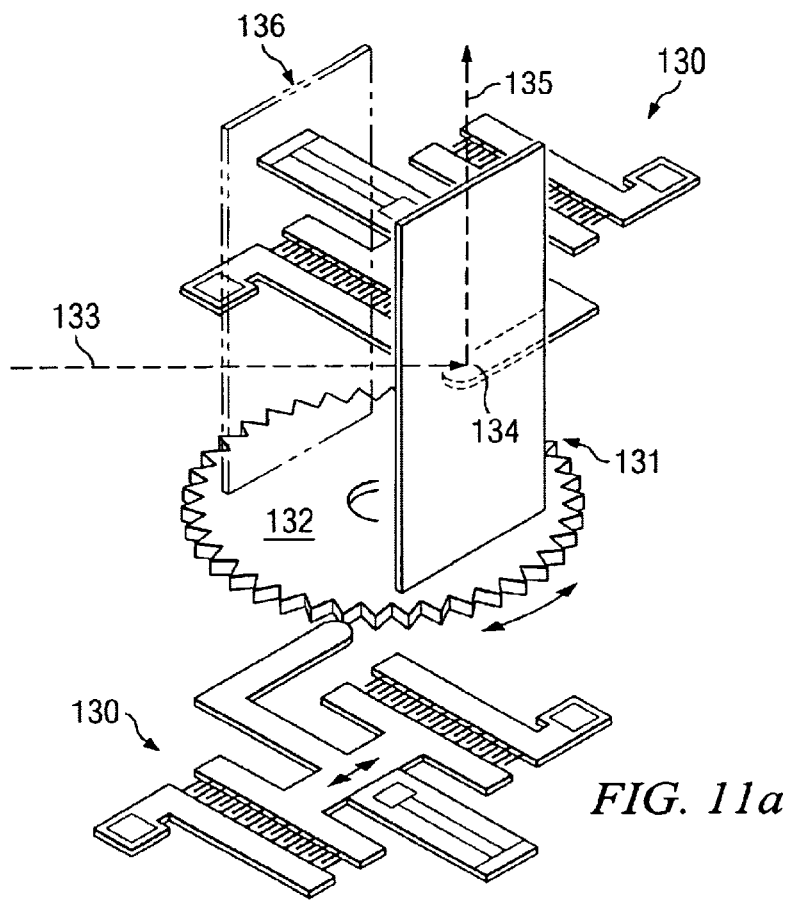
FIGS. 11 through 15 show various actuator mechanisms and various types of designs for the mirror.
Figure 11B:
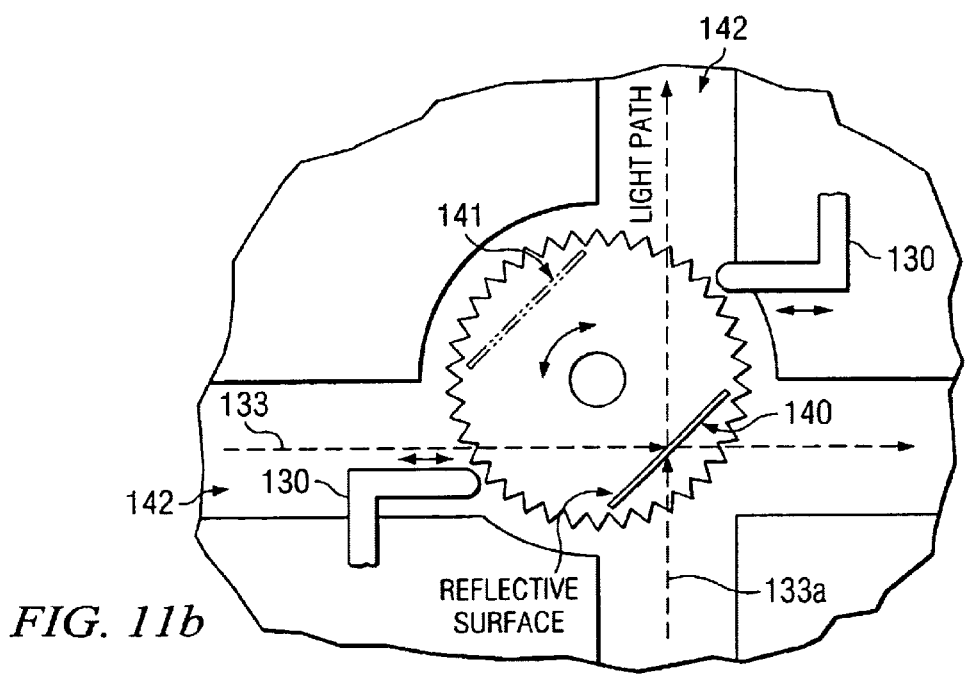
Figure 11C:
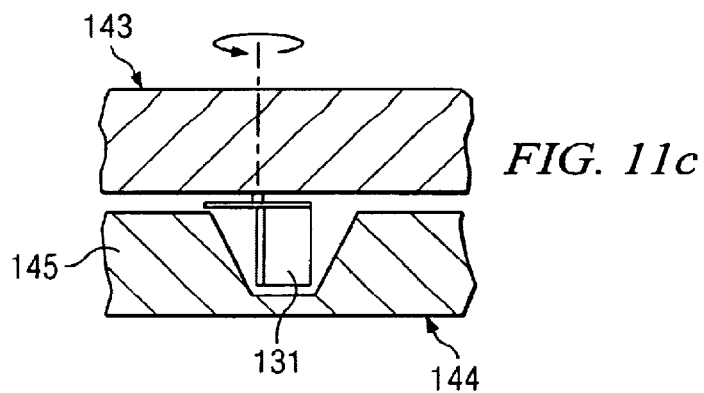

FIG. 10 shows a design for a mechanism that places the fibers into the holder structures described above. It starts with a spool of fiber (not shown) and using rotating gears that are interconnected, grabs the fibers to place them physically into the grooves of the holder system. The mechanism can also places the tape above the fibers as it is placed into the groove to hold it down temporarily before the upper part of the sandwich is mechanically placed. This is but one of multiple other possible mechanical designs to lay the fibers in the grooves. Those skilled in the art will be able to device various modifications, which although not explicitly described or shown herein, embody the principles of the invention discussed here.

FIGS. 11 through 15 show various actuator mechanisms and various types of designs for the mirror. These are all mechanical mirrors which are used to reflect light or to let the light go through from the input fiber all the way across from left to right. FIG. 11a shows an example of a comb drive mechanism which would rotate a mirror using a comb drive motor and teeth on a gear onto which the mirror is mechanically connected vertically. FIG. 11a shows two comb drives (130) per mirror, where the mirror (131) itself is not centered but is offset within the platter (132) onto which it is mounted. The light signal (133) would either hit the mirror (at 134) when it is in the light path, reflecting it 90 degrees (135); or if the mirror is out of the light path (136) the light signal would go right through that intersection. FIG. 11b shows the same mechanism from a top down perspective, the on (140) and off positions (141) of the mirror, (i.e, either reflecting the light or not reflecting the light). Again, note that the mirror is offset from the center of the light paths (133, 133a) defined by the horizontal and vertical waveguides (142). With the sandwich wafer construction previously discussed, this mirror would actually be placed upside down onto the waveguide wafer. FIG. 11c shows a cross section showing the upper wafer (143), the bottom wafer (144), the waveguides, and the mirror (134).

Figure 12A:
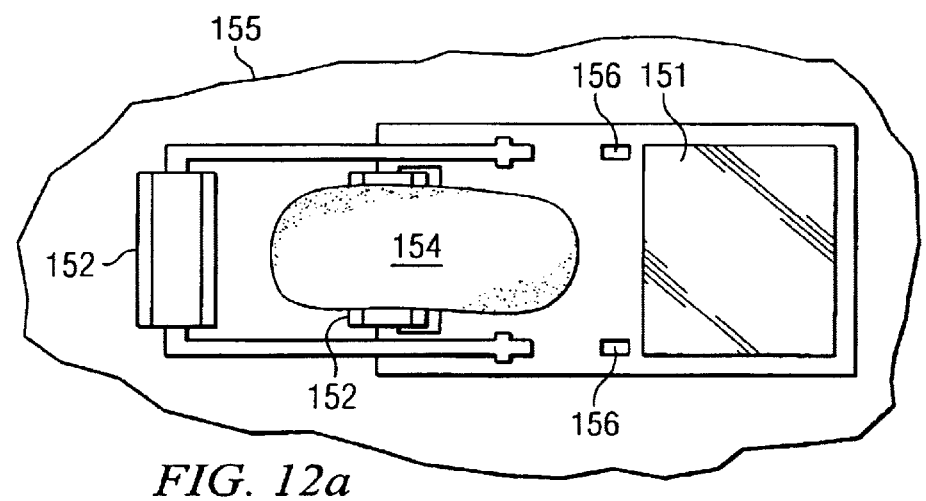
Figure 12B:
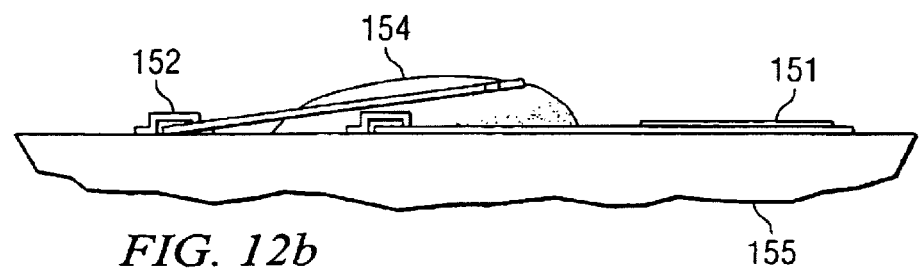
Figure 12C:
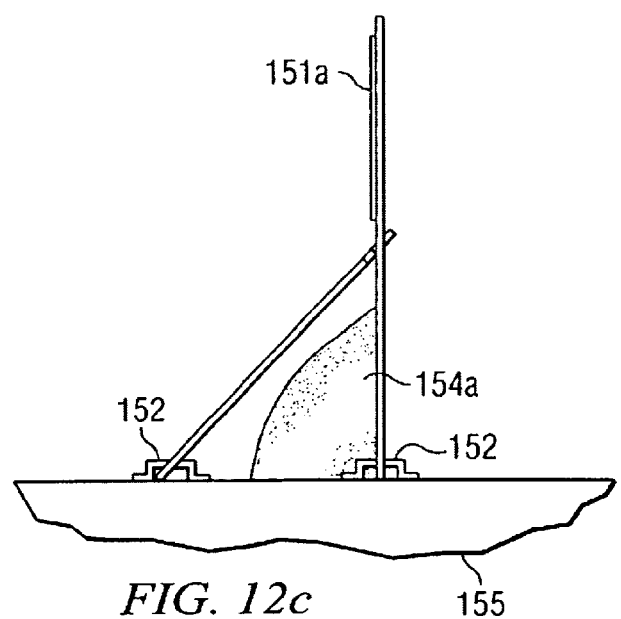

FIG. 12 shows a technique of a flat mirror can be manufactured and then raised to 90 degrees so that it becomes vertical and capable of reflecting light. This "self-assembling" mirror could be made into a sub assembly that is then sacrificially placed into a secondary wafer which would contain the rest of the comb drives, or potentially could be built with a comb drive and other elements to be installed onto the same wafer. In FIG. 12a the sub assembly is shown to have a canter levered mirror (151) on hinges (152) which is lifted once (and only once) across the whole wafer. After fabrication of the basic elements of the sub assembly using MEMS techniques, the whole wafer is heated such that the solder blob (154) which sits both on a surface of the wafer (155, see side view of FIG. 12b) as well as on part of the hinge assembly, heats up and the surface tension of the solder when melting would pull vertically up the polished metal (i.e., the mirror surface). See FIG. 12c. When the mirror reaches a vertical position there is a stop on the hinge (156) which aligns it to be perfectly 90 degrees vertical. The wafer is then cooled, the solder solidifies (154a) and a raised mirror (151a) as shown in FIG. 12c is achieved. This process would be performed simultaneously on all mirrors on the wafer.

Figure 13A:
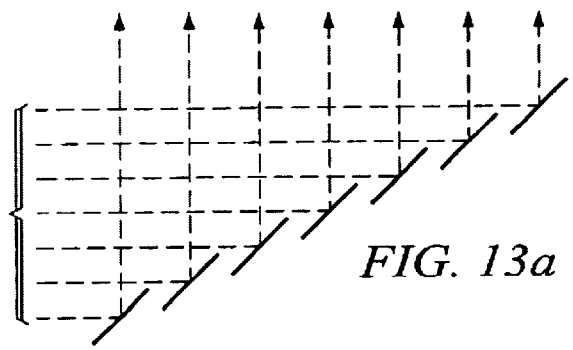
Figure 13B:
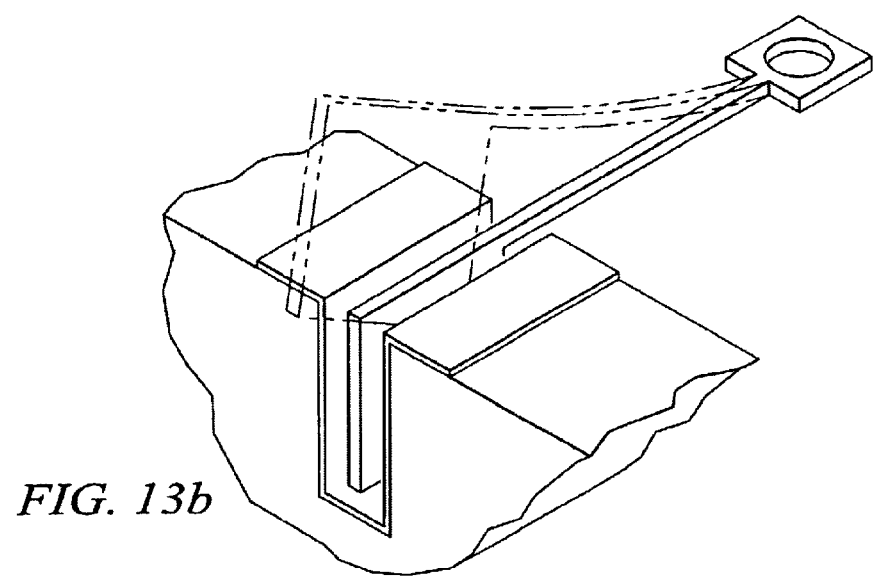

FIG. 13a shows another approach of having a variable continuator based on the position of mirrors. In this case the light beam is large enough to span across multiple mirrors. Each mirror covers 1/n th of the total area of the light beam and is merely able to deflect part of the light beam (or not when "off"). By virtue of the integration of all of the mirrors one can variably intinuate a particular signal in routing it from the left horizontally to the upper vertically output side. FIG. 13b shows another possible mechanism for building a mirror. In this case, the mirror is shown in the activated state. This being a two element or two node circuit element, by putting opposite voltages of high enough magnitude, each plate of the mirror can be attracted mechanically/electrostatically to the inside groove, thereby not blocking the light path above it. By releasing the voltage, the spring tension of the hinge holding the mirror down would bring it back up, and then it would interrupt the light path and presumably rerouting the light path 90 degrees. That would be the "on" state, which in this case is the no voltage state of this mirror assembly. This electrostatically actuated mirror is another technique of building a mirror which is simpler in construction than the mechanically actuated ones.

Figure 14:
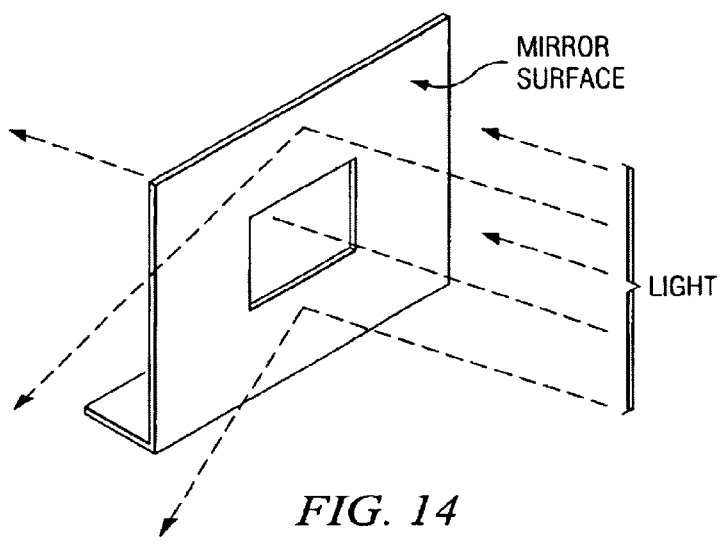

FIG. 14 shows a mirror that can be applied to various types of actuators. The mirror has a has a hole in it to let light pass through. This would be an equivalent to a 90 degree mirror or a 50 degree mirror by virtue of the area/ratio between the hole versus the total surface area of the mirror. The point is that even when actuated and creating a light path from an input to an output fiber in this case, this mirror still lets certain light out, such that at the far left of this optical path is an optical/electrical converter to monitor operating power. This allows the system to monitor power levels even if the light path is being routed to an output device.

Figure 15A:
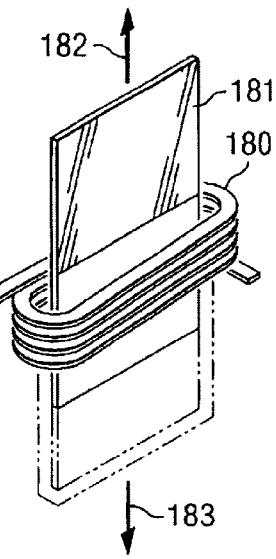
Figure 15B:
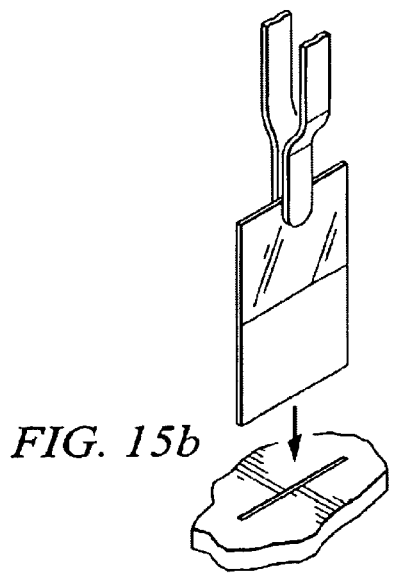
Figure 15C:
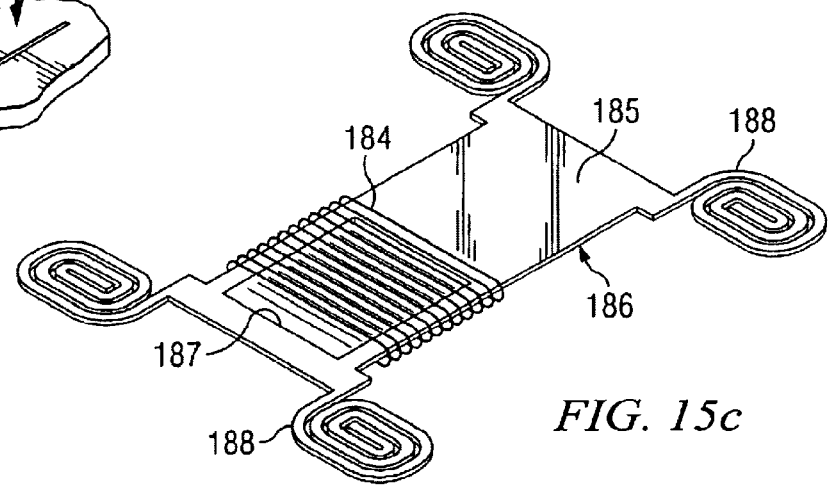

FIG. 15 shows two different schemes for electromagnetically actuated mirrors. FIG. 15a shows one such mirror whereby a form of a coil (180) is wound around a magnetically active reflective surface (i.e., a mirror. 181). By virtue of electromagnetic forces and running current in different directions through the coil, one could cause the mirror to float up (182) or to float down (183) and thereby either interrupt the light path or letting it go through in an optical system. FIG. 15b shows how potentially such a reflective surface, which would be a separately fabricated subcomponent, could be literally grabbed and placed into the wafer subsequent to the wafer manufacturing. FIG. 15c, shows what is called a "Plane Solenoid" actuator whereby a coil (184) which is running across and circulating across the bottom portion of the surface (186), where by virtue of having a hole (187), there is a different magnetic property. By running current through the coil in one direction, the rest of the magnet (where the polish surface is, 185) is pulled towards the coil, thereby opening up the light path and not reflecting where the polish surface was. When the current is stopped, the springs (which are the four legs holding the actuator and mirror surface, 188) pull back into the "on" state thereby causing light to be reflected.

The foregoing merely illustrates the principles of the present invention. Those skilled in the art will be able to devise various modifications, which although not explicitly described or shown herein, embody the principles of the invention and are thus within its spirit and scope.

What we claim are:

1. A method of constructing optical structures on semiconductor wafers, comprising the steps of:
   fabricating multiple Optical Switch components on a top wafer;
   fabricating a waveguide wafer, wherein the waveguide wafer includes an optical waveguide matrix, fiber attachments and holding structures, and control/monitoring electronics, wherein said waveguide matrix has a plurality of cross-points where the waveguides intersect;
   creating a receptacle to accommodate an Optical Switch component at each cross-point of said waveguide matrix;
   fabricating an electrical network on said top wafer, such that said electrical network provides power and control signals to said Optical Switch components on the top wafer until the optical switch components are installed on the waveguide wafer;
   fabricating mechanical structures and actuators on the top wafer, such that said mechanical structures and actuators may be used to assist with installation of said Optical Switch components on the waveguide wafer;
   fabricating a set of mating structures on said top wafer and said waveguide wafer, such that each wafer's mating structure is coupled with an opposing structure on the other wafer when the two wafers are brought together;
   aligning said wafers with each other by using the mating structures;
   bringing said top wafer and said waveguide wafer together until the mating structures on the top wafer make mechanical and electrical contact with the mating structures on the waveguide wafer, such that each Optical Switch component on said top wafer is precisely positioned at each cross-point of the waveguide matrix on the waveguide wafer;
   installing the optical switch components onto the waveguide wafer to form electrical and mechanical connections from the waveguide wafer to the respective Optical Switch component at each site in the waveguide matrix;
   detaching the top wafer from the waveguide wafer, once each Optical Switch component is properly attached to the waveguide wafer;
   removing the top wafer and leaving behind the installed Optical Switch components on the waveguide wafer.

2. A method according to claim 1, wherein the Optical Switch components fabricated on the top wafer are not identical.

3. A method according to claim 1 wherein more than one top wafer is used in sequence to fabricate and install a variety of Optical Switch components onto a single waveguide wafer.

4. A method according to claim 3 wherein more than one top wafer is used to install components, followed by a final sandwich wafer that installs a final set of components and closes the system.

5. A method according to claim 1, wherein the optical switch components are individually placed at the crosspoints of the switching matrix via a standard pick-and-place robot.

6. A method according to claim 1 wherein wafer-to-wafer alignment in the X- and Y-directions is performed using standard wafer alignment techniques.

7. A method according to claim 1, wherein each mating structure have an elevated edge running around the circumference of each wafer.

8. A method according to claim 7, wherein the elevated edge contains grooves which facilitate the wafers staying aligned once they are brought together.

9. A method according to claim 1, wherein the mating structures are raised platforms at several points throughout the wafer can also be used to make contact between the wafers at points interior to the outer circumference.

10. A method according to claim 1, wherein the mating structures is a cone or pyramid fabricated on one wafer, with a round or square hole at the corresponding location on the other wafer.

11. A method according to claim 1, wherein Z-axis alignment of the wafers is facilitated by incorporating proximity sensors into the mating structures of one or both wafers.

12. A method according to claim 11, wherein the proximity sensor is a strain sensor.

13. A method according to claim 11, wherein the proximity sensor is an electrical switch.

14. A method according to claim 11, wherein the proximity sensor is an optical sensor.

15. A method according to claim 11, wherein the proximity sensor is a tunneling current sensor.

16. A method according to claim 1, wherein fibers are pre-installed into the fiber attachment and holding structures.

17. A method according to claim 16, wherein single fibers are strung from an external optical connector to the fiber attachment and holding structures via a pick-and-place machine, with individual fibers being secured by gluing or taping or sandwiched under a rectangular block mated to the fiber attachment and holding structure.

18. A method according to claim 16, wherein the fibers are cleaved to uniform length all at once.

19. A method according to claim 1, wherein multiple top wafers are fabricated using a variety of processing and fabrication techniques, and these top wafers are then applied in succession to a single waveguide wafer, so as to install a variety of Optical Switch components onto the waveguide wafer.

* * * * *